(12) United States Patent
Fujii

(10) Patent No.: US 10,477,081 B2
(45) Date of Patent: Nov. 12, 2019

(54) IMAGING APPARATUS FOR USE ON A CEILING OR WALL SURFACE

(71) Applicant: CANON KABUSHIKI KAISHA, Tokyo (JP)

(72) Inventor: Kazuki Fujii, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/927,884

(22) Filed: Mar. 21, 2018

(65) Prior Publication Data

US 2018/0288290 A1 Oct. 4, 2018

(30) Foreign Application Priority Data

Mar. 29, 2017 (JP) .................. 2017-066282

(51) Int. Cl.
| | |
|---|---|
| *H04N 5/225* | (2006.01) |
| *H04N 7/18* | (2006.01) |
| *F16M 13/02* | (2006.01) |
| *F16M 11/04* | (2006.01) |
| *G08B 13/196* | (2006.01) |

(52) U.S. Cl.
CPC ......... *H04N 5/2252* (2013.01); *F16M 11/041* (2013.01); *F16M 13/02* (2013.01); *F16M 13/027* (2013.01); *G08B 13/19619* (2013.01); *H04N 5/2253* (2013.01); *H04N 7/183* (2013.01)

(58) Field of Classification Search
USPC .................. 396/427; 348/143, 144
See application file for complete search history.

(56) References Cited

U.S. PATENT DOCUMENTS

| | | | |
|---|---|---|---|
| 5,588,625 A | 12/1996 | Beak | |
| 6,268,882 B1 * | 7/2001 | Elberbaum | ...... G08B 13/19619 348/143 |
| 7,217,045 B2 * | 5/2007 | Jones | ................. G08B 13/1963 348/373 |
| 8,197,148 B2 * | 6/2012 | Kajino | ................. H04N 5/2251 396/427 |
| 2015/0249777 A1 * | 9/2015 | Chen | ................... H04N 5/2257 348/151 |

FOREIGN PATENT DOCUMENTS

| | | |
|---|---|---|
| CN | 1940704 A | 4/2007 |
| CN | 201345691 Y | 11/2009 |
| CN | 203522874 U | 4/2014 |
| CN | 104106002 A | 10/2014 |
| JP | 2003-189138 A | 7/2003 |

* cited by examiner

*Primary Examiner* — Clayton E. LaBalle
*Assistant Examiner* — Warren K Fenwick
(74) *Attorney, Agent, or Firm* — Canon U.S.A., Inc. IP Division

(57) ABSTRACT

There is provided a monitoring camera including a first case that contains lens barrel unit and is rotationally movable between a first lock position and a first release position, and a second case that covers the lens barrel unit disposed in the first case and is rotationally movable between a second lock position and a second release position, wherein the second case can be removed from the first case in a state where the first case is fixed to an installation member by rotationally moving the second case to a first direction from the second lock position to the second release position in a state where the first case is located at the first lock position.

7 Claims, 11 Drawing Sheets

IMAGING APPARATUS FOR USE ON A CEILING OR WALL SURFACE

BACKGROUND

Field of the Disclosure

The present disclosure relates to an imaging apparatus used in a state of being installed on a ceiling or a wall surface and for which maintenance work is easy.

Description of the Related Art

Conventionally, for example, an imaging apparatus discussed in Japanese Patent Application Laid-Open No. 2003-189138 has been known. As to the imaging apparatus, a camera holder, which has an imaging unit and to which a camera cover is attached, is fixed to a base portion fixed to a ceiling or a wall surface.

In a conventional technology discussed in Japanese Patent Application Laid-Open No. 2003-189138, in a case of maintenance of the camera in the camera holder, the camera holder with the camera cover attached thereto needs to be removed from the base portion, and the camera holder and the camera cover need to be separated from each other. Therefore, this conventional technique needs time and effort, and thus various countermeasures are desired.

SUMMARY

The present disclosure is directed to an imaging apparatus for which maintenance work on an imaging unit is made easier.

According to an aspect of the present disclosure, an imaging apparatus includes an installation member configured to be fixed to a fixing surface, a first case in which an imaging unit is disposed and configured to be movable between a first lock position where the first case is fixed to the installation member and a first release position where the first case can be removed from the installation member, and a second case covering the imaging unit disposed in the first case and configured to be movable between a second lock position where the second case is fixed to the first case and a second release position where the second case can be removed from the first case, wherein the second case is movable from the second lock position to the second release position in a state where the first case is located at the first lock position.

Further features of the present disclosure will become apparent from the following description of exemplary embodiments with reference to the attached drawings.

DESCRIPTION OF THE EMBODIMENTS

An exemplary embodiment of the present disclosure will be described below with reference to the drawings.

Figure 1:
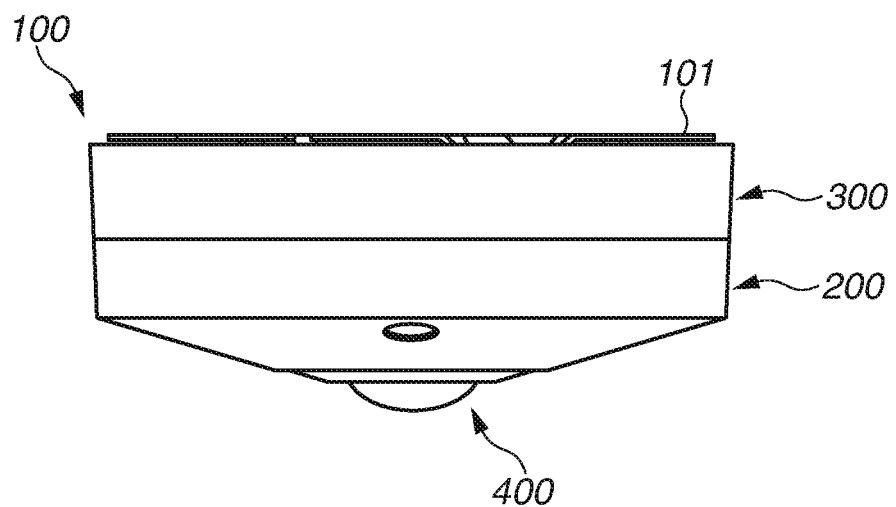
FIG. 1 is a diagram illustrating an appearance of a monitoring camera according to an exemplary embodiment of the subject disclosure.
Figure 2:
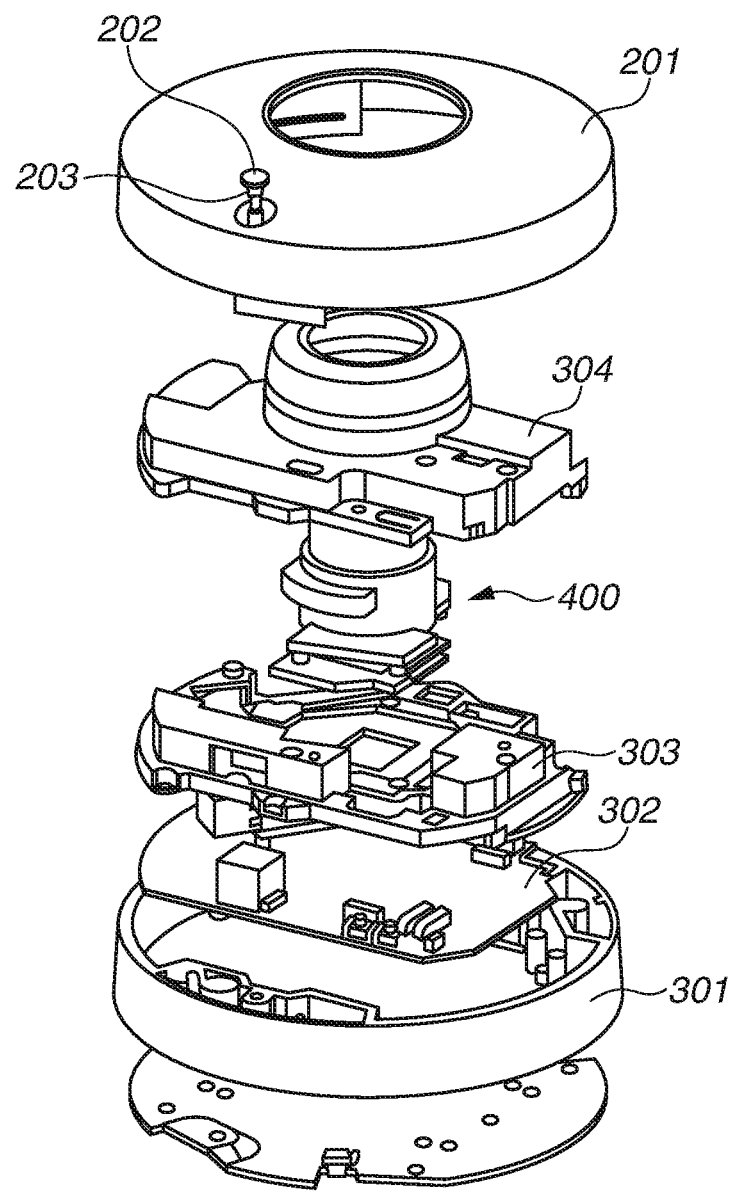
FIG. 2 is an exploded perspective view illustrating the monitoring camera according to the exemplary embodiment of the subject disclosure.
Figure 3:
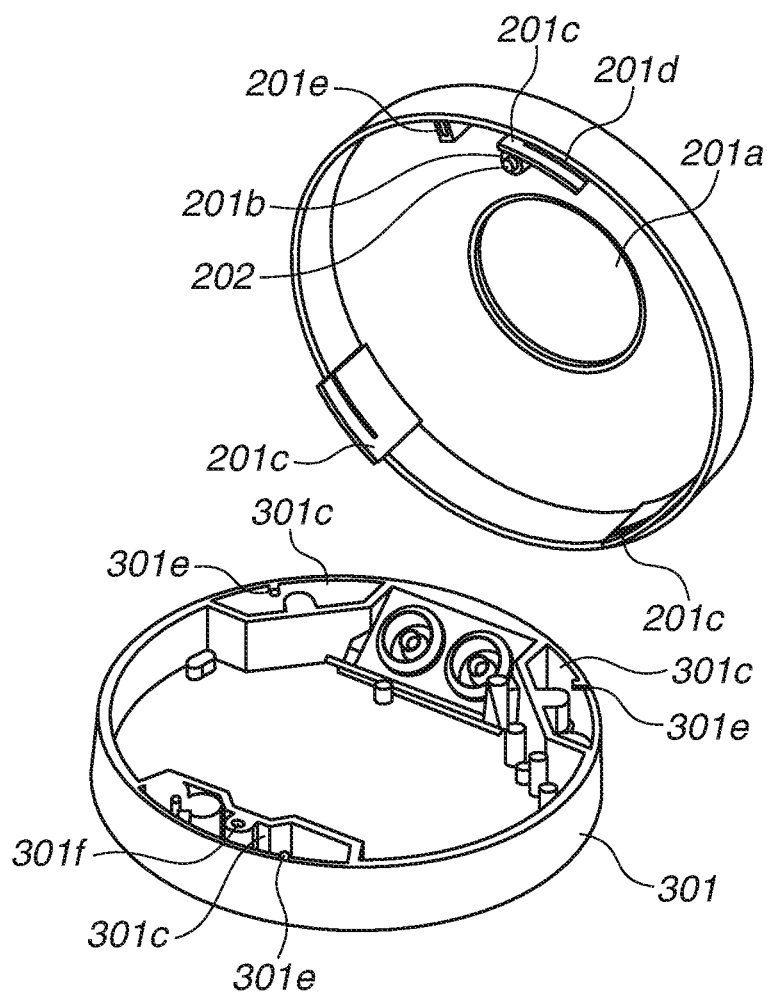
FIG. 3 is an exploded perspective view illustrating a lower case and an upper case of the monitoring camera according to the exemplary embodiment of the subject disclosure.
Figure 4:
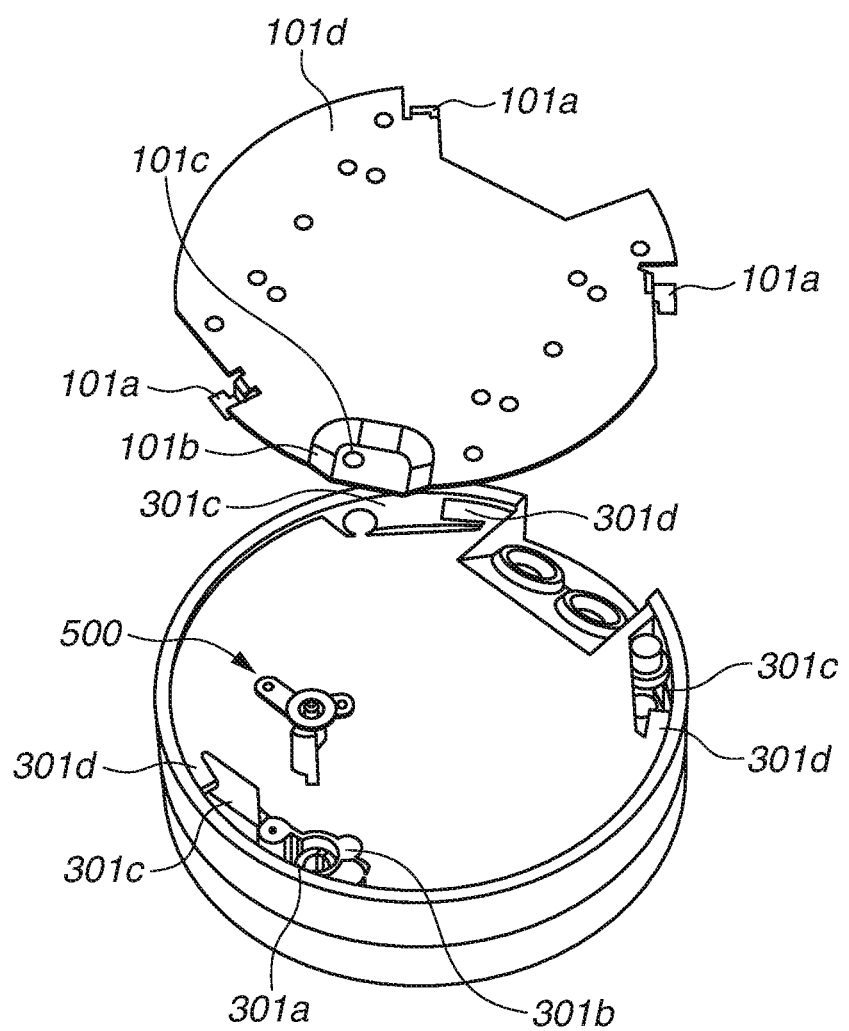
FIG. 4 is an exploded perspective view illustrating an installation member and the lower case of the monitoring camera according to the exemplary embodiment of the subject disclosure.
Figure 5:
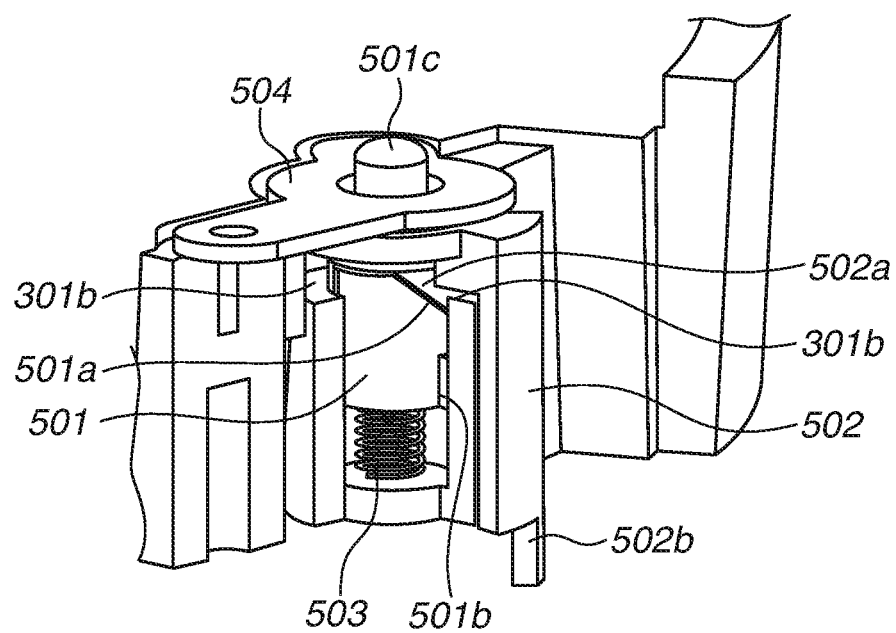
FIG. 5 is a detailed diagram illustrating a rotation control unit of the monitoring camera according to the exemplary embodiment of the subject disclosure.

FIG. 1 is a diagram illustrating an appearance of a monitoring camera 100 serving as an imaging apparatus according to an exemplary embodiment. FIG. 2 is an exploded perspective view illustrating the monitoring camera 100 according to the present exemplary embodiment. FIG. 3 is an exploded perspective view illustrating a lower case (first case) 301 and an upper case (second case) 201 of the monitoring camera 100 according to the present exemplary embodiment. FIG. 4 is an exploded perspective view illustrating an installation member 101 and the lower case 301 of the monitoring camera 100 according to the present exemplary embodiment. FIG. 5 is a detailed diagram of a rotation limiting unit 500 of the monitoring camera 100 according to the present exemplary embodiment.

The monitoring camera 100 according to the present exemplary embodiment includes, as illustrated in FIG. 1, the installation member 101, an upper case unit 200, and a lower case unit 300.

The installation member 101 is a member that is fixed to fixing surface such as a ceiling or a wall surface and is sheet metal. The installation member 101 includes, as illustrated in FIG. 4, a hook 101a, a depressed portion 101b, a through hole 101c, and an installation portion 101d as one example of a first lock mechanism.

The hook 101a is a portion that is engaged with the lower case unit 300. The hook 101a has an L shape, and three hooks 101a are provided in a peripheral direction at predetermined intervals.

The depressed portion 101b protrudes from the installation portion 101d toward the lower case unit 300 and is provided at an end of the installation portion 101d.

The through hole 101c is a portion through which a rotation limiting unit 500, described below, is inserted, and is formed in the depressed portion 101b.

The installation portion 101d is a portion that is fixed to a ceiling or a wall surface, and has a shape in which a circular portion is partially notched.

The upper case unit 200 includes, as illustrated in FIG. 2, the upper case 201 as one example of a second case, a screw 202, and a compression coil spring 203.

The upper case 201 includes, as illustrated in FIG. 3, a circular opening 201a, a screw hole 201b, and as one example of a second lock mechanism, a first rib 201c, a protruding portion 201d, and a second rib 201e.

Figure 7:
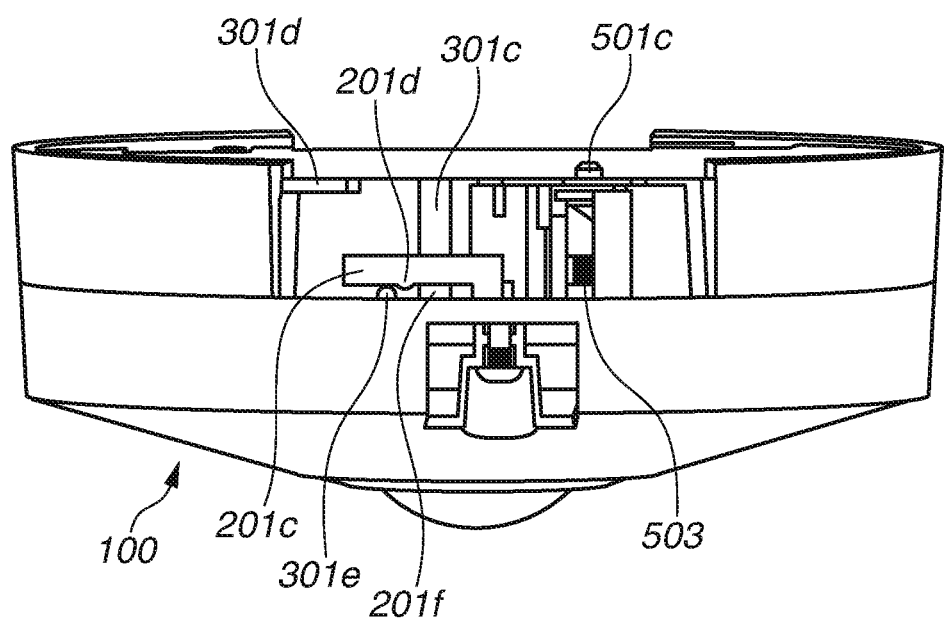
FIG. 7 is a diagram illustrating the attached state of the lower case and the upper case of the monitoring camera according to the exemplary embodiment of the subject disclosure.

The opening 201a is provided at a center of the upper case 201, and a lens barrel unit 400 is disposed in the opening 201a. The screw 202 for fixing the upper case 201 to the lower case 301 is inserted into the screw hole 201b. Three first ribs 201c are disposed in the circumferential direction at intervals, and a groove 201f that extends in the circumferential direction is formed on each of first ribs 201c. As illustrated in FIG. 7, the protruding portion 201d protrudes toward an inside of each of the grooves 201f. The second rib 201e is a member that contacts the rotation limiting unit 500, described below, when the upper case unit 200 is rotated. The second rib 201e protrudes from an inner periphery surface of the upper case 201 toward an inside of the upper case 201.

The screw 202 is inserted into the screw hole 201b of the upper case 201 and is assembled with the lower case 301 as a unit.

The compression coil spring 203 is assembled to be held between the screw 202 and the upper case 201. The compression coil spring 203 biases the screw 202 toward the upper case 201.

The lower case unit 300 includes, as illustrated in FIG. 2, the lower case 301 as an example of a first case, a first cover member 303, and a second cover member 304, and the rotation limiting unit 500 illustrated in FIG. 4.

The lower case 301 includes a receiving portion 301a, a slide groove 301b, a trapezoidal portion 301c having an approximately trapezoidal shape, a lock portion 301d as one example of the first lock mechanism, a first protrusion 301e as one example of the second lock mechanism, and a screw hole 301f.

The receiving portion 301a has an approximately cylindrical shape, and the rotation limiting unit 500, described below, is disposed at the receiving portion 301a.

A rib 501b of the rotation limiting unit 500, described below, is disposed in the slide groove 301b. The slide groove 301b guides the rib 501b of the rotation limiting unit 500.

The trapezoidal portion 301c is arranged in three places in the peripheral direction at regular intervals. The trapezoidal portion 301c passes completely through in a height direction.

The lock portion 301d engages with the hook 101a of the installation member 101. The lock portion 301d, which has a rectangular shape, is provided inside the trapezoidal portion 301c.

The first protrusion 301e protrudes from an end of the lower case 301 toward the inside thereof, and is disposed in the groove 201f of the upper case 201.

The screw hole 301f matches with the screw hole 201b at a position where the first protrusion 301e of the lower case 301 contacts the protruding portion 201d of the upper case 201.

The first cover member 303 is, as illustrated in FIG. 2, disposed to cover a main substrate 302 and is fixed to the lower case 301. Further, the lens barrel unit 400 as one example of an imaging unit is fixed to a center of the first cover member 303. The lens barrel unit 400 includes a lens barrel portion having a lens group and an imaging element substrate including an imaging element thereon. The lens barrel portion and the imaging element substrate are electrically connected to the main substrate 302 by an electric connecting unit such as a flexible printed circuit (FPC), not illustrated.

The second cover member 304 is, as illustrated in FIG. 2, disposed to cover the main substrate 302, the first cover member 303, and the lens barrel unit 400, and is fixed to the lower case 301.

The rotation limiting unit 500 includes, as illustrated in FIG. 5, the slide member 501 that can be driven in a height direction of the monitoring camera 100, a biasing release member 502, a biasing member 503, and a lid 504.

The slide member 501 is movable along the height direction of the monitoring camera 100, and includes an inclined surface 501a, the rib 501b disposed in the slide groove 301b, and a second protrusion 501c.

The biasing release member 502 includes an inclined surface 502a that contacts the inclined surface 501a of the slide member 501, and a contact portion 502b that contacts the second rib 201e.

The biasing member 503 biases the second protrusion 501c toward the through hole 101c of the installation member 101.

The rotation limiting unit 500 is assembled to the lower case 301. The biasing member 503, the slide member 501, the biasing release member 502, and the lid 504 are assembled to the receiving portion 301a of the lower case 301 in this order. The lid 504 is fixed to the lower case 301. At this time, the rib 501b of the slide member 501 is fitted into the slide groove 301b of the lower case 301, and thus the slide member 501 is assembled slidably along the height direction of the lower case 301.

Further, the inclined surface 501a of the slide member 501 and the inclined surface 502a the biasing release member 502 are assembled to contact each other. As a result, a rotational movement of the biasing release member 502 about a center axis enables the biasing of the biasing member 503 to be released and the second protrusion 501c to be operated in the height direction of the lower case 301.

Figure 6:
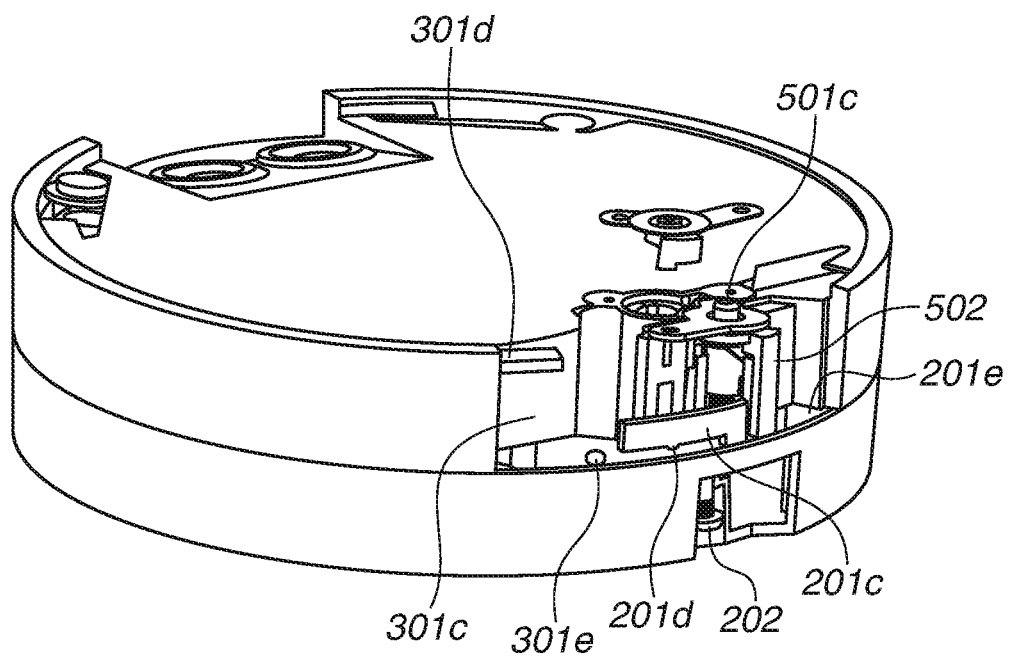
FIG. 6 is a diagram illustrating an attached state of the lower case and the upper case of the monitoring camera according to the exemplary embodiment of the subject disclosure.

Assembly of the upper case unit 200 and the lower case unit 300 will be described below with reference to FIGS. 6 and 7. FIGS. 6 and 7 are diagrams illustrating the assembly of the upper case unit 200 and the lower case unit 300 of the monitoring camera 100 according to the present exemplary embodiment. FIG. 6 illustrates a state where the lower case (first case) 301 is located at a second release position. FIG. 7 illustrates a state where the lower case 301 is located at a second lock position.

As to the assembly of the upper case unit 200 and the lower case unit 300, as illustrated in FIG. 6, the first rib 201c of the upper case 201 is inserted into the trapezoidal portion 301c so as not to interfere with the first protrusion 301e of the lower case 301. An end surface of the upper case 201 is caused to contact an end surface of the lower case 301. In the contacting state, the upper case 201 is rotated in a first direction where the first protrusion 301e of the lower case 301 is located. As illustrated in FIG. 7, the first protrusion 301e is engaged with so as to be inserted into the groove 201f the first rib 201c the upper case 201. Thereby, a movement of the upper case unit 200 with respect to the lower case unit 300 is limited in the height direction. Further, as illustrated in FIG. 7, at a position where the first protrusion 301e of the lower case 301 contacts the protruding portion 201d of the upper case 201, a position of the screw hole 201b of the upper case unit 200 matches with a position of the screw hole 301f of the lower case unit 300. In this state, fastening of the screw 202 can limit relative rotation of the upper case unit 200 and the lower case unit 300. The example where the upper case 201 is rotated with respect to the lower case 301 has been described, but the lower case 301 may be rotated with respect to the upper case 201 to assemble the upper case unit 200 and the lower case unit 300.

Figure 8:
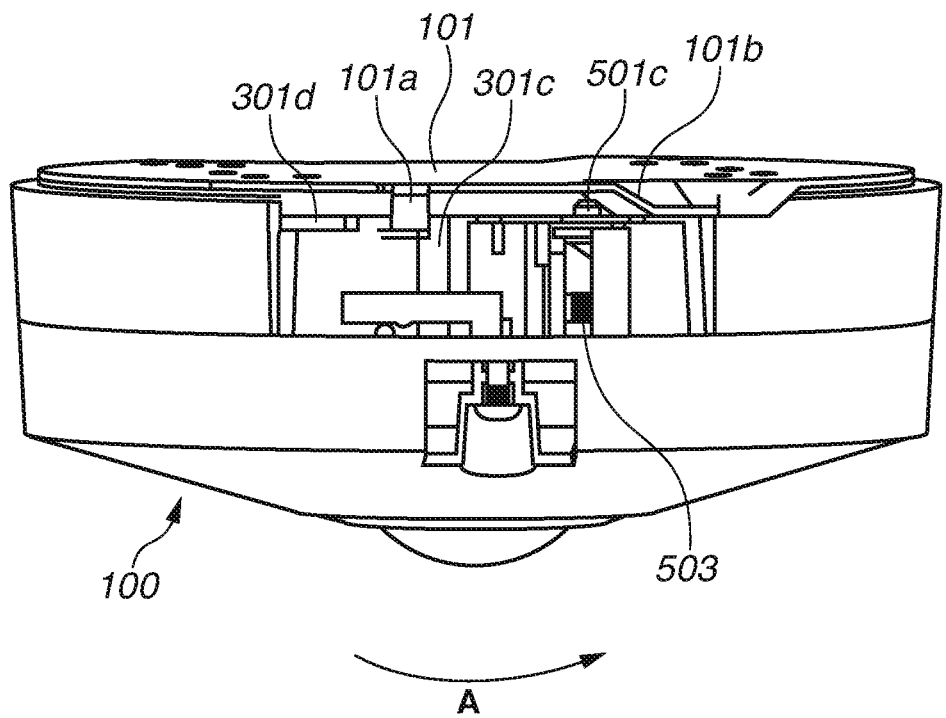
FIG. 8 is a diagram illustrating a state before installation of the monitoring camera according to the exemplary embodiment of the subject disclosure.
Figure 9:
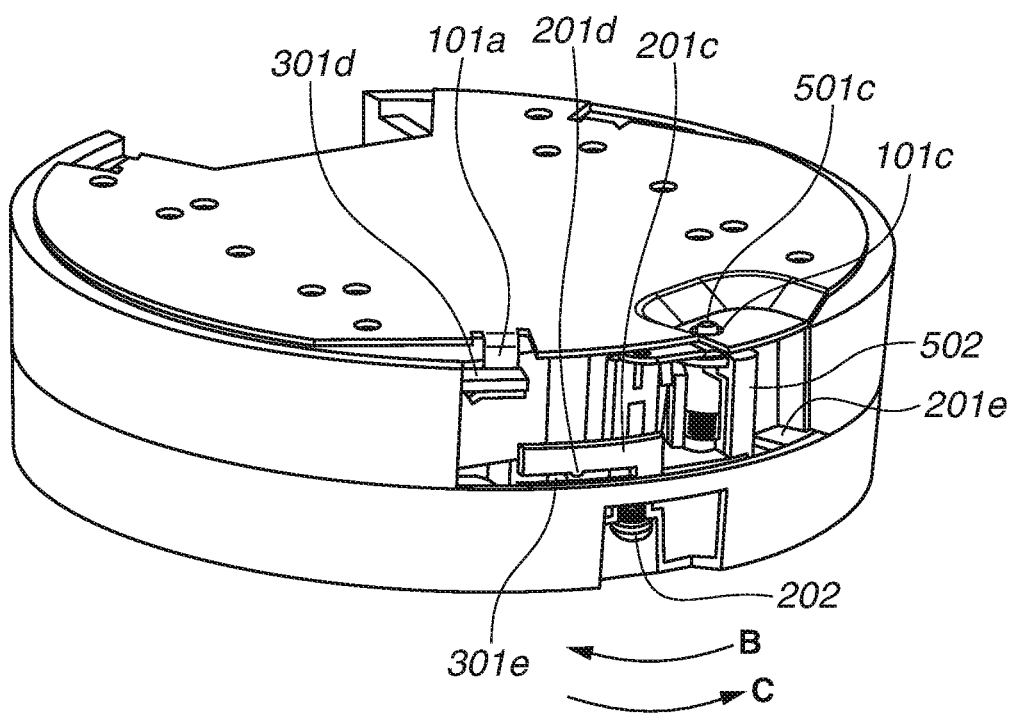
FIG. 9 is a diagram illustrating a state after the installation of the monitoring camera according to the exemplary embodiment of the subject disclosure.

Work for installing the monitoring camera 100 of the present exemplary embodiment to a ceiling or a wall surface will be described below with reference to FIGS. 8 and 9. FIG. 8 is a diagram illustrating a state before installation of the monitoring camera 100 according to the present exemplary embodiment. FIG. 9 is a diagram illustrating a state after the installation of the monitoring camera 100 according to the present exemplary embodiment. FIG. 8 illustrates a state where the lower case (first case) 301 is located at a first release position and the upper case (second case) 201 is located at the second lock position. FIG. 9 illustrates a state where the lower case 301 is located at a first lock position and the upper case 201 is located at the second lock position.

As to the installation of the monitoring camera 100, the installation member 101 is first fixed to a ceiling or a wall surface. As illustrated in FIG. 8, the lower case unit 300 is disposed on the installation member 101 so that the hook 101a of the installation member 101 is disposed in the trapezoidal portion 301c of the lower case unit 300. The lower case unit 300 is rotated in the first direction (A direction in FIG. 8), and as illustrated in FIG. 9, the hook 101a and the lock portion 301d are engaged with each other.

In other words, in a state where the upper case 201 is located at the second lock position, the lower case 301 is rotationally moved in the first direction (A direction) from the first release position to the first lock position with respect to the installation member 101 installed on a fixing surface. As a result, the monitoring camera 100 is installed to the fixing surface. Further, when the rotation of the lower case unit 300 in the A direction causes the second protrusion 501c of the rotation limiting unit 500 to reach the depressed portion 101b of the installation member 101, the second protrusion 501c is pressed by the depressed portion 101b. Further rotation moves the rotation limiting unit 500 of the lower case unit 300 along the depressed portion 101b of the installation member 101. When the second protrusion 501c of the rotation limiting unit 500 reaches the position to be fitted into the through hole 101c of the installation member 101, the second protrusion 501c is disposed inside the through hole 101c by a biasing force of the biasing member 503. Thus, the movements of the lower case unit 300 in the height direction and the rotational direction are limited to be brought into a state illustrated in FIG. 9, and the installation of the monitoring camera 100 to a ceiling or a wall surface is completed.

Since the monitoring camera 100 according to the present exemplary embodiment can be installed to a ceiling or a wall surface by a rotational operation, a load on an installation worker is small, and thus the installation of the monitoring camera 100 to a ceiling or the like is easy.

Figure 10:
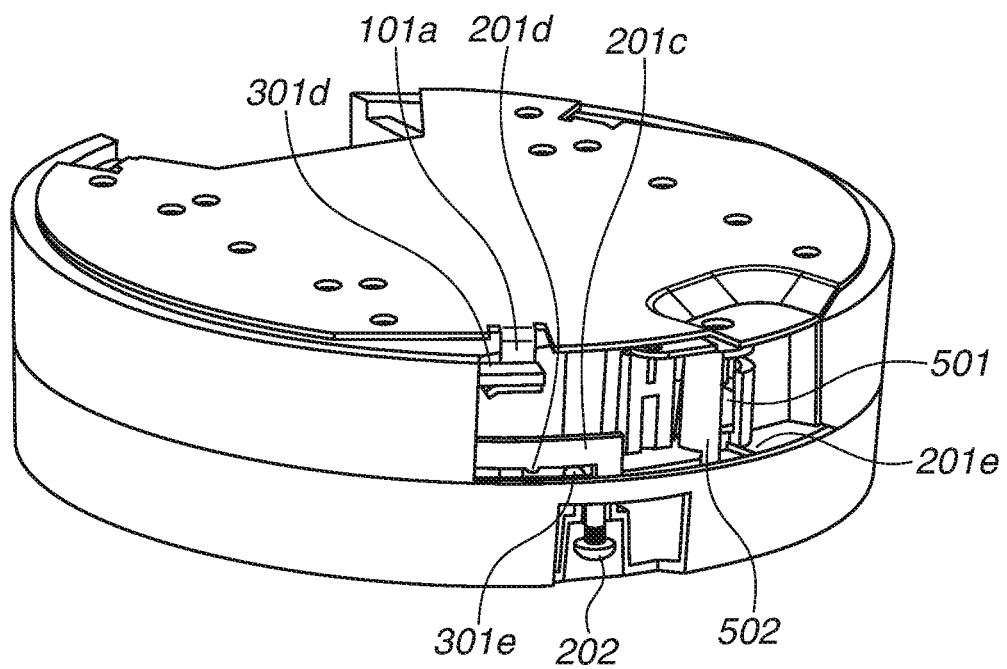
FIG. 10 is a diagram illustrating a state in which the upper case and the lower case of the monitoring camera in the attached state is being removed according to the exemplary embodiment of the subject disclosure.

Work for removing the upper case unit 200 and the lower case unit 300 together a unit from the installation member 101 will be described below with reference to FIGS. 9 and 10. FIG. 10 is a diagram illustrating a state where the upper case unit 200 and the lower case unit 300 of the monitoring camera 100 according to the present exemplary embodiment are removed together as a unit. FIG. 10 illustrates a state where the lower case 301 is located at the first lock position and the upper case 201 is located at the second lock position.

First, rotational limitation of the upper case unit 200 is released by releasing the fastening of the screw 202 of the upper case unit 200. In this state, the upper case unit 200 is rotated in a second direction (B direction in FIG. 9). At this time, since the protruding portion 201d of the upper case unit 200 interferes with the first protrusion 301e of the lower case unit 300, the first rib 201c of the upper case unit 200 is deformed by an amount of interference with the first protrusion 301e. Further, the second rib 201e formed on the upper case 201 operates the biasing release member 502 of the rotation limiting unit 500.

As a result, the second protrusion 501c moves in a direction in which the second protrusion 501c is separated from the installation member 101, and thus the rotational limitation of the installation member 101 and the lower case unit 300 is released. Further, the rotation in the same direction brings about a state illustrated in FIG. 10. Further rotation causes the engagement of the hook 101a with the lock portion 301d to be released, and the upper case unit 200 and the lower case unit 300 can be removed together as a unit from the installation member 101.

In other words, the lower case 301, which is located at the first lock position, is rotationally moved from the first lock position to the first release position by rotationally moving the upper case 201, which is at the second lock position, to the second direction (B direction) which is opposite to the first direction. In such a manner, the lower case 301 and the upper case 201 can be removed together as a unit from the installation member 101.

As described above, in the monitoring camera 100 according to the present exemplary embodiment, the upper case 201 and the lower case 301 can be removed together as a unit from the installation member 101 by a simple operation.

Figure 11:
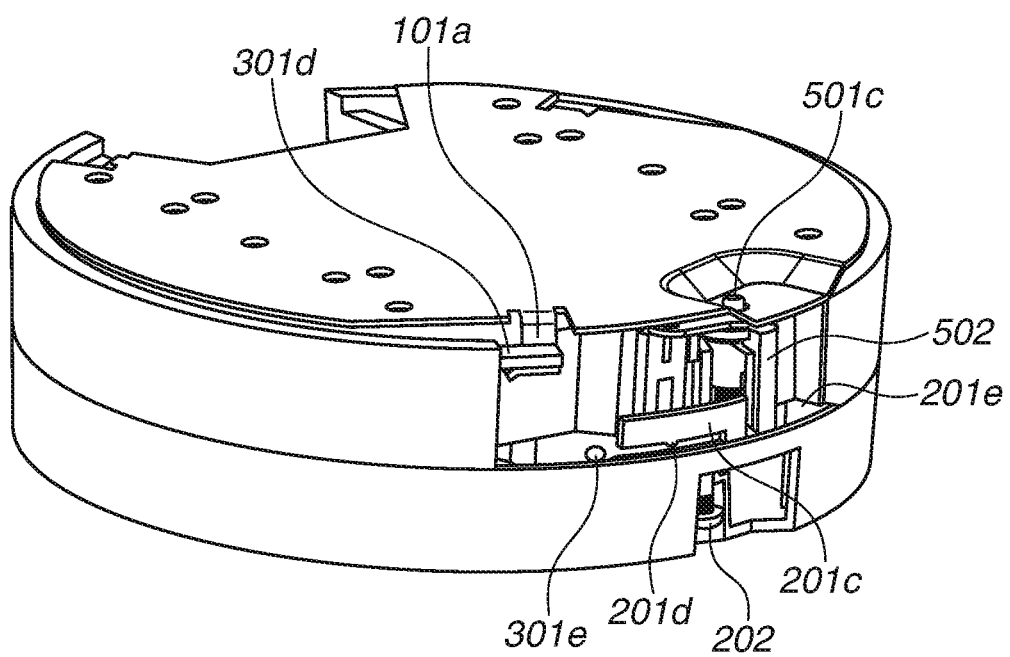
FIG. 11 is a diagram illustrating a state in which the upper case of the monitoring camera is to be removed according to the exemplary embodiment of the subject disclosure.

Work for removing the upper case unit 200 from the lower case unit 300 will be described below with reference to FIGS. 9 and 11. FIG. 11 is a diagram illustrating a state where the upper case unit 200 of the monitoring camera 100 according to the present exemplary embodiment is removed. FIG. 11 illustrates a state where the lower case 301 is located at the first lock position and the upper case 201 is located at the second release position.

First, rotational limitation of the upper case unit 200 is released by releasing the fastening of the screw 202 of the upper case unit 200. In this state, the upper case unit 200 is rotated in the first direction (C direction in FIG. 9). With this rotation, as illustrated in FIG. 11, the engagement between the first rib 201c of the upper case unit 200 and the first protrusion 301e of the lower case unit 300 is released, and only the upper case unit 200 can be removed from the monitoring camera 100. At this time, the engagement state and the rotational limitation state between the lower case unit 300 and the installation member 101 are maintained.

In other words, in a state where the lower case 301 is located at the first lock position, the upper case 201 is rotationally moved in the first direction (C direction) from the second lock position to the second release position. This enables the upper case 201 to be removed from the lower case 301 in a state where the lower case 301 is fixed to the installation member 101.

In the monitoring camera 100 according to the present exemplary embodiment, since only the upper case unit 200 can be removed by a simple operation, maintenance of the lens barrel unit 400 can be performed in a state that the lower case unit 300 is installed.

Further, the rotational operation is performed in a direction in which the protruding portion 201d of the upper case unit 200 does not contact the first protrusion 301e of the lower case unit 300. For this reason, an operation torque required for this rotational operation is smaller than that in a case where the upper case unit 200 and the lower case unit 300 are removed together.

Therefore, in a case the maintenance is desired to be performed in a state where, for example, the lower case unit 300 is to stay installed, removal of the lower case unit 300 and the upper case unit 200 together as a unit can be prohibited by a worker recognizing which unit to be removed.

Further, a direction where the upper case unit 200 is rotated in the case where the lower case unit 300 and the upper case unit 200 are removed together as a unit (B direction) is opposite to a direction where the upper case unit 200 is rotated in the case where only the upper case unit 200 is removed (C direction).

As a result, an erroneous operation by the worker can be restrained.

The present disclosure has been described above based on the exemplary embodiment. The present disclosure is, however, not limited to this exemplary embodiment and thus the present disclosure includes various forms without departing from the scope of the present disclosure. Further, some parts of the above-described exemplary embodiment may be suitably combined and/or substituted with elements known in the art.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2017-066282, filed Mar. 29, 2017, which is hereby incorporated by reference herein in its entirety.

What is claimed is:

1. An imaging apparatus comprising:
    an installation member configured to be fixed to a fixing surface;
    a first case in which an imaging unit is disposed and configured to be attachable to and detachable from the installation member; and
    a second case covering the imaging unit disposed in the first case and configured to be attachable to and detachable from the first case,
    wherein the second case is detachable from the first case attached to the installation member when the second case is rotated in a first direction, and the second case and the first case are integrally detachable from the installation member when the second case is rotated in a second direction opposite to the first direction.

2. The imaging apparatus according to claim 1, further comprising:
    a first lock mechanism including a lock portion provided in the first case, and a hook provided in the installation member and configured to lock the lock portion; and
    a second lock mechanism including a first rib provided in the second case and having a groove and a first protrusion provided in the first case and disposed in the groove of the first rib,
    wherein the first case configured to be movable between a first lock position where the first case is fixed to the installation member and a first release position where the first case can be removed from the installation member,
    wherein the second case configured to be movable between a second lock position where the second case is fixed to the first case and a second release position where the second case can be removed from the first case,
    wherein the first lock position is a position at which the first case is fixed to the installation member by locking the lock portion with the hook,
    wherein the first release position is a position at which the first case can be removed from the installation member by releasing the locking of the lock portion,
    wherein the second lock position is a position at which the second case is fixed to the first case by locating the first protrusion in the groove,
    wherein the second release position is a position at which the second case can be removed from the first case by locating the first protrusion outside the groove, and
    wherein in a state where the first case is fixed to the installation member, the second case can be removed from the first case by rotationally moving the second case in a first direction from the second lock position to the second release position in a state that the first case is located at the first lock position.

3. The imaging apparatus according to claim 2, wherein the first case is rotationally moved from the first lock position to the first release position by rotationally moving the second case from a state where the first case is located at the first lock position and the second case is located at the second lock position to a second direction opposite to the first direction, and the first case and the second case can be removed together as a unit from the installation member.

4. The imaging apparatus according to claim 3,
    wherein the groove has a protruding portion that protrudes toward an inside of the groove, and
    wherein the protruding portion contacts the first protrusion in a case where the first case and the second case are removed together as a unit from the installation member, and does not contact the first protrusion in a case where the second case is removed from the first case in a state where the first case is fixed to the installation member.

5. The imaging apparatus according to claim 2, wherein the imaging apparatus can be installed on the fixing surface by rotationally moving the first case with respect to the installation member, which is installed on the fixing surface, in the first direction from the first release position toward the first lock position in a state where the second case is located at the second lock position.

6. The imaging apparatus according to claim 2,
    wherein the installation member has a through hole, and the first case has a second protrusion that is inserted into the through hole, and
    wherein the rotational movement of the first case from the first lock position to the first release position is restricted by inserting the second protrusion into the through hole.

7. The imaging apparatus according to claim 6,
    wherein the first case includes a biasing member configured to bias the second protrusion toward the through hole so as to insert the second protrusion into the through hole, and a biasing release member configured to release the biasing toward the second protrusion, and
    wherein the biasing of the biasing member toward the second protrusion is released by causing the biasing release member to contact the second case in a case where the second case rotationally moves, and the second protrusion is located outside the through hole.

* * * * *